US009380412B2

(12) United States Patent
Kaushansky

(10) Patent No.: US 9,380,412 B2
(45) Date of Patent: Jun. 28, 2016

(54) SYSTEM AND METHOD FOR LOCATION OF WIRELESS COMMUNICATION TERMINALS USING APPLICATION-LEVEL LOCATION DATA

(75) Inventor: Amir Kaushansky, Herzelia (IL)

(73) Assignee: VERINT SYSTEMS LTD., Herzilya Pituach (IL)

( * ) Notice: Subject to any disclaimer, the term of this patent is extended or adjusted under 35 U.S.C. 154(b) by 167 days.

(21) Appl. No.: 13/550,859

(22) Filed: Jul. 17, 2012

(65) Prior Publication Data

US 2013/0184011 A1 Jul. 18, 2013

(30) Foreign Application Priority Data

Jul. 18, 2011 (IL) .......................................... 214142

(51) Int. Cl.
*H04W 4/02* (2009.01)
(52) U.S. Cl.
CPC ...................................... *H04W 4/02* (2013.01)
(58) Field of Classification Search
CPC ..... H04M 3/2281; H04W 4/22; H04W 64/00; H04W 76/007; H04W 4/02
USPC ......... 370/252; 455/404.2, 440, 456.1, 456.3, 455/456.5, 457, 461
See application file for complete search history.

(56) References Cited

U.S. PATENT DOCUMENTS

| 2005/0063544 | A1* | 3/2005 | Uusitalo et al. ............... 380/277 |
| 2006/0155706 | A1 | 7/2006 | Kalinichenko |
| 2006/0195570 | A1* | 8/2006 | Zellner et al. .................. 709/224 |
| 2009/0067420 | A1* | 3/2009 | Ganesan et al. ............... 370/389 |
| 2010/0317317 | A1* | 12/2010 | Maier et al. ................. 455/404.2 |
| 2011/0199260 | A1* | 8/2011 | Garrett et al. ............. 342/357.35 |
| 2011/0264656 | A1* | 10/2011 | Dumais et al. ................ 707/728 |
| 2014/0012941 | A1* | 1/2014 | Smith et al. ................... 709/217 |

FOREIGN PATENT DOCUMENTS

WO 2010116292 A2 10/2010

OTHER PUBLICATIONS

3GPP TS 24.008 v3.8.0, "3rd Generation Partnership Project; Technical Specification Group Core Network; Mobile radio interface layer 3 specification; Core Network Protocols—Stage 3," Release 1999, (Jun. 2001), 442 pages.

(Continued)

*Primary Examiner* — Dinh P Nguyen
(74) *Attorney, Agent, or Firm* — Meunier Carlin & Curfman

(57) ABSTRACT

Methods and systems for tracking the locations of wireless communication terminals such as mobile phones. A location system monitors communication conducted between a wireless communication terminal and a wireless communication network. The monitoring system may monitor the communication by intercepting one or more of the interfaces or links between network elements. The location system decodes the monitored communication, and identifies an interaction between the terminal and a server that provides the terminal with a location-based service. The identification may be performed, for example, by detecting a data pattern that is indicative of the Application Programming Interface (API) of the location-based service. The monitoring system then finds location data in the decoded communication between the terminal and the server. The monitoring system extracts this location data and uses it to track the location of the terminal.

10 Claims, 2 Drawing Sheets

(56) References Cited

OTHER PUBLICATIONS

Asokan, N., et al., "Man-in-the-Middle in Tunneled Authentication Protocols," Draft version 1.3 (latest public version: http://eprint.iacr.org/2002/163/, Nov. 11, 2002, 15 pages.

Vedaldi, Andrea, "An implementation of SIFT detector and descriptor," University of California at Los Angeles, 7 pages.

Girardin, Fabien, et al., "Detecting air travel to survey passengers on a worldwide scale," Journal of Location Based Services, 26 pages.

Meyer, Ulrike, et al., "On the Impact of GSM Encryption and Man-in-the-Middle Attacks on the Security of Interoperating GSM/UMTS Networks," IEEE, 2004, 8 pages.

* cited by examiner

SYSTEM AND METHOD FOR LOCATION OF WIRELESS COMMUNICATION TERMINALS USING APPLICATION-LEVEL LOCATION DATA

FIELD OF THE DISCLOSURE

The present disclosure relates generally to communication systems, and particularly to methods and systems for locating wireless communication terminals.

BACKGROUND OF THE DISCLOSURE

Various techniques for measuring the geographical locations of communication terminals are known in the art. Such techniques are used in various wireless networks, for example to provide emergency services, to track suspect users or for intelligence gathering.

SUMMARY OF THE DISCLOSURE

An embodiment that is described herein provides a method including monitoring communication of a wireless communication terminal over a wireless communication network. An interaction between the terminal and a server, which provides a location-based service to the terminal, is identified based on the monitored communication. Location data, which is indicative of a geographical location of the terminal, is extracted from the monitored communication between the terminal and the server. A location of the wireless communication terminal is tracked based on the extracted location data.

In some embodiments, the communication carries Internet Protocol (IP) traffic, and monitoring the communication includes decoding the IP traffic. In an embodiment, decoding the IP traffic includes extracting an IP address associated with the terminal, and tracking the location includes finding a correlation between the extracted IP address and an identifier that identifies the terminal in the wireless communication network, and tracking the location using the identifier. In a disclosed embodiment, the IP traffic is encrypted in accordance with a secure communication protocol, and monitoring the communication includes decrypting the encrypted IP traffic.

In another embodiment, identifying the interaction includes detecting in the monitored communication a data pattern indicative of an Application Programming Interface (API) of the location-based service. Extracting the location data may include identifying the API based on the data pattern, and finding the location data in the monitored communication based on the API. In yet another embodiment, the terminal progressively refines an accuracy of the location data exchanged with the server, and tracking the location includes refining the accuracy of tracking the location based on the refined-accuracy location data.

In some embodiments, the terminal is predefined as a target terminal whose location is to be tracked. In alternative embodiments, the method includes indiscriminately monitoring the communication of multiple wireless communication terminals, identifying interactions between at least a subset of the terminals with one or more servers that provide location-based services, and extracting the location data of the terminals in the subset so as to track the locations of the terminals in the subset.

There is additionally provided, in accordance with an embodiment that is described herein, apparatus including an interface and a processor. The interface is configured for communicating with a wireless communication network. The processor is configured to monitor via the interface communication of a wireless communication terminal over the wireless communication network, to identify, based on the monitored communication, an interaction between the terminal and a server that provides a location-based service to the terminal, to extract location data, which is indicative of a geographical location of the terminal, from the monitored communication between the terminal and the server, and to track a location of the wireless communication terminal based on the extracted location data.

The present disclosure will be more fully understood from the following detailed description of the embodiments thereof, taken together with the drawings in which:

DETAILED DESCRIPTION OF EMBODIMENTS

Overview

Figure 1:
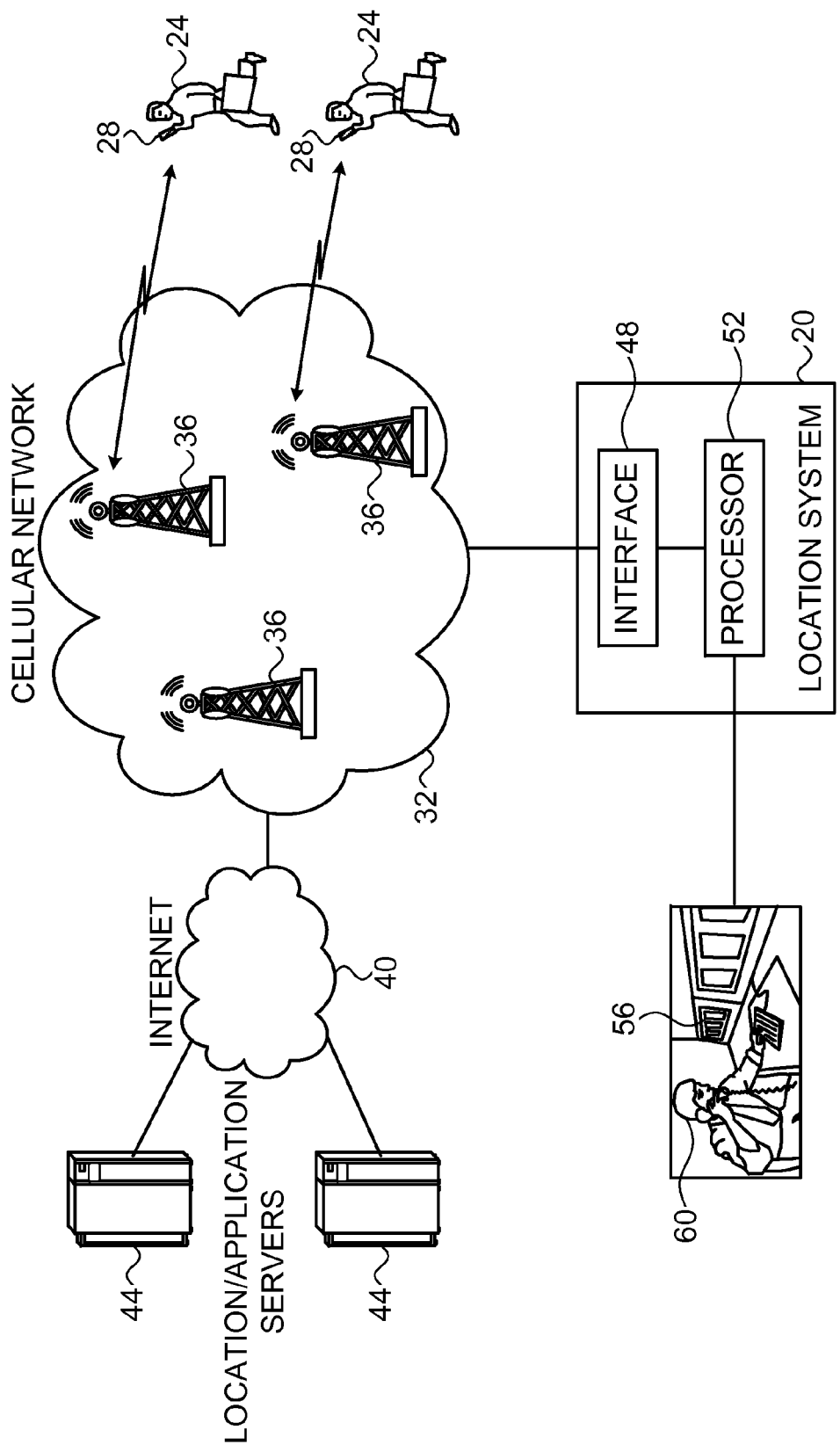
FIG. 1 is a block diagram that schematically illustrates a location system, in accordance with an embodiment that is described herein.

Embodiments of the present disclosure that are described hereinbelow provide improved methods and systems for tracking the locations of wireless communication terminals such as mobile phones. The disclosed techniques can be used, for example, for tracking suspect users, for intelligence gathering or for any other suitable purpose. These methods and systems identify, decode and exploit location data that the terminals transmit and/or receive while communicating with servers that provide location-based services.

Location-based services may comprise, for example, mapping and navigation services in which the terminal displays its geographical location on a map, services that inform the terminal of nearby businesses, location-based social networks, and many others. In some location-based services, the terminal communicates with a server, and in particular provides the server with location data indicative of the terminal's geographical location. The location data may comprise, for example, an identifier of a cellular base station (cell) or Wi-Fi hotspot with which the terminal communicates, or location coordinates measured by a Global Positioning System (GPS) receiver in the terminal. In some service types, the server sends location data to the terminal. For example, in some services the terminal sends its cell identifier to the server, and the server retrieves the location coordinates of the cell from a cell database and sends the coordinates to the terminal. In the context of the present patent application and in the claims, the term "location data" refers to any data that is indicative of the terminal's geographical location and is communicated between the terminal and a server.

In some embodiments, a location system monitors communication conducted between a wireless communication terminal and a wireless communication network. The communication may comprise, for example, Internet Protocol (IP) traffic. The monitoring system may monitor the communication by intercepting one or more of the interfaces or links between network elements. The location system decodes the monitored communication, and identifies an interaction between the terminal and a server that provides the terminal with a location-based service. The identification may be performed, for example, by detecting a data pattern that is indicative of the Application Programming Interface (API) of the location-based service. The monitoring system then finds location data in the decoded communication between the terminal and the server. The monitoring system extracts this location data and uses it to track the location of the terminal (and thus of the user of the terminal).

One unique advantage of using the above-described location data is that this data is usually transmitted at frequent time intervals. Therefore, the methods and systems described herein are particularly suitable for real-time location tracking applications. This property is in contrast, for example, to location techniques that are based on network events initiated by the terminal (e.g., location updates). Such network events are often infrequent and do not enable fine time resolution.

Moreover, the disclosed techniques may be carried out using either active or passive monitoring of network communications, and are therefore suitable both for tracking of selected target terminals and for non-selective tracking of large numbers of terminals.

System Description

FIG. 1 is a block diagram that schematically illustrates a location system 20, in accordance with an embodiment that is described herein. System 20 tracks the locations of users 24 that operate wireless communication terminals 28 in a wireless communication network 32. System 20 may be used, for example, for tracking suspect users, for intelligence gathering or for any other suitable application. The system may be deployed, for example, by intelligence or government agencies, by law enforcement or public safety bodies, or by any other suitable party.

Terminals 28 may comprise, for example, cellular phones, wireless-enabled mobile computers or Personal Digital Assistants (PDAs), or any other suitable type of device having wireless communication capabilities. Network 32 may comprise, for example, a Global System for Mobile communications (GSM) network, a Universal Mobile Telecommunications System (UMTS) network, a Wireless Local Area Network (WLAN—also referred to as Wi-Fi) or any other suitable type of wireless communication network. In the present example, network 32 comprises a cellular network in which terminals 28 communicate with base stations 36.

Network 32 is connected to a data network 40, in the present example the Internet. Network 40 comprises one or more servers 44, which provide location-based services to terminals 28. A location-based service may comprise any service that is provided to terminals 28 and utilizes information regarding the geographical locations of the terminals to which the service is provided. Examples of location-based services comprise mapping and navigation services in which the terminal displays its geographical location on a map, social network services and many others. Servers 44 may provide terminals 28 with any suitable location-based service.

When using a location-based service, a given terminal 28 communicates with one or more of servers 44 via networks 32 and 40. Typically, the terminal and the server communicate by exchanging Internet Protocol (IP) traffic. In particular, the terminal and the server exchange location data that is indicative of the geographical location of the terminal. Location data may be transmitted in the IP traffic from the terminal to the server, from the server to the terminal, or both.

System 20 monitors the communication conducted between at least some of terminals 28 and network 32, in order to track the terminal locations. Monitoring may be carried out using passive means, e.g., using one or more passive probes that intercept one or more of the interfaces between network elements (e.g., switches) in network 32.

In alternative embodiments, system 20 monitors the communication using active means. For example, in many cases the IP traffic between the terminal and the server is encrypted in accordance with a cryptographic communication protocol. Example protocols are Secure Sockets Layer (SSL) or Transport Layer Security (TLS). In some embodiments, system 20 decrypts the cryptographic protocol so as to extract unencrypted data. In some embodiments the encryption comprises a public-key encryption scheme in which the server provides a security certificate to the terminal. In an example embodiment, system 20 replaces the certificate of the terminal with a substitute certificate, and is therefore able to decrypt the transport-layer encryption. Such techniques are sometimes referred to as "Man in The Middle" (MITM) techniques. Alternatively, monitoring may be performed in any other suitable passive or active way.

For a given terminal, the system decodes the monitored communication (e.g., IP traffic) and identifies that the terminal is provided with a location-based service by one of servers 44. Having made this identification, system 20 finds in the decoded communication location data that is transferred between the terminal and the server as part of providing the location-based service. The system extracts the location data and uses it to track the location of the terminal.

In the example of FIG. 1, system 20 comprises an interface 48 for receiving the monitored communication from network 32, and a processor 52 that carries out the methods described herein. Processor 52 outputs the location coordinates of the tracked terminal or terminals. In the present example, processor 52 provides the terminal coordinates to a monitoring center 56, in which an operator 60 tracks the terminal or terminals in question.

The configuration of system 20 shown in FIG. 1 is an example configuration, which is chosen purely for the sake of conceptual clarity. In alternative embodiments, any other suitable system configuration can be used. The system elements may be implemented using hardware, software or using a combination of hardware and software elements. Typically, processor 52 comprises a general-purpose computer, which is programmed in software to carry out the functions described herein. The software may be downloaded to the computer in electronic form, over a network, for example, or it may, alternatively or additionally, be provided and/or stored on non-transitory tangible media, such as magnetic, optical, or electronic memory.

Location Tracking Using Location Data of Location-Based Services

A given terminal 28 and a given server 44 may exchange location data in various ways while providing location-based services to the terminal. Consider, for example, a navigation or mapping service that displays a map on the terminal's screen and indicates the terminal's location on the map. In an example implementation of such a service, the terminal sends to the server an identifier of the cell via which the terminal communicates with network 32 (often referred to as a Cell ID). The server queries an on-line database, which holds location coordinates and corresponding cell IDs of cellular base stations. The server retrieves the location coordinates that correspond to the cell ID indicated by the terminal, and sends the coordinates to the terminal. Using this technique, the terminal is able to display its location with high accuracy.

As another example, the terminal may comprise an internal Global Positioning System (GPS) receiver that measures the location coordinates of the terminal with high accuracy. In some embodiments, a server of a location-based service may request the terminal to provide its location coordinates as measured by the GPS receiver. The terminal sends the location coordinates to the server in response to this request, and the server uses these coordinates for providing the location-based service.

In all the above examples, the cell ID and GPS coordinates sent by the terminal, and the location coordinates sent by the server, can be regarded by system 20 as location data. System 20 may detect and extract any such location data and use it to track the terminal's location. The specific types of location data described above were chosen purely by way of example. In alternative embodiments, any other suitable type of location data may be used.

In many cases, the location data is transferred between the terminal and the server at frequent time intervals while the terminal is provided with the location-based service. For example, location data may be transmitted every several seconds. By detecting and extracting such frequent location data from the terminal-server communication, system 20 may track the terminal location in real time and with high accuracy.

Note that in order to track specific target terminals, the system typically correlates the IP address that is associated with the terminal with one or more identifiers that identify the terminal in network 32. Example identifiers that can be used for this purpose are the terminal's International Mobile Subscriber Identity (IMSI), International Mobile Equipment Identity (IMEI) or Mobile Subscriber Integrated Services Digital Network Number (MSISDN). Once correlation is established, the system may track the terminal location using the identifier in question. In order to perform this correlation, the system may extract the IP address from the monitored IP traffic, and in addition monitor one or more internal links in network 32, e.g., links between Mobile Switching Centers (MSCs) or other network nodes.

It is important to distinguish the location data used by system 20 from location indications (e.g., cell ID) that is transmitted in network 32 as part of network events. The location data used by the disclosed techniques comprises application-level data that is embedded in the application-level communication (e.g., IP traffic) between the terminal and the server providing the location-based service. In order to access this location data, system 20 decodes the terminal-server communication (e.g., decodes the IP traffic to reproduce the application-level communication). The location indications sent in network events, on the other hand, use the internal protocols of wireless network 32 and are not related to any kind of application-level communication.

Processor 52 of system 20 may identify that a given terminal 28 communicates with (and is provided with a location-based service by) a given server 44 in various ways. For example, some location-based services use an Application Programming Interface (API) that has a characteristic data pattern. Examples of such APIs are Google Geolocation API, Skyhook, NaviZone and Location-API. Processor 52 may search the decoded terminal-server traffic for a characteristic data pattern of a known API. If such a data pattern is found, the processor may conclude that the decoded traffic indeed relates to a location-based service that is being provided to the terminal. The detected data pattern may also assist the processor in finding the location data in the decoded traffic. In alternative embodiments, any other suitable method can be used to carry out this identification.

Some location-based services progressively refine the accuracy of the location data over time, in order to provide both fast response time and accurate location. For example, when the service is initiated the terminal may have access only to the cell ID, which has limited accuracy. At a later point in time the terminal may obtain the identity of a nearby Wi-Fi hotspot, which provides finer location accuracy. After a while the terminal may have access to GPS data, which provides an even finer accuracy. Typically, the terminal updates the server with the higher-accuracy location data as it becomes available. System 20 may identify these updates, extract the updated location data transferred to the server, and refine the location tracking accuracy of the system accordingly.

As noted above, in some embodiments the communication traffic between the terminal and the server is encrypted, and processor 52 decrypts the traffic in order to find and extract the location data. For example, the IP traffic may be sent using a secure communication protocol such as Secure Sockets Layer (SSL) or Transport Layer Security (TLS), which includes encryption. In these embodiments, processor 52 decrypts the secure protocol and finds the location data in the decrypted traffic.

In some embodiments, the traffic is encrypted twice—one encryption relating to the wireless protocol in network 32, and another encryption relating to the embedded IP traffic. When exchanging secure IP traffic in a GSM network, for example, the traffic is first encrypted with SSL or TLS, and later encrypted with A51 or A52 encryption in accordance with the GSM specification. In these embodiments, processor 52 decrypts both types of encryption in order to access the location data.

Processor 52 may decrypt secure protocols such as SSL or TLS using any suitable method. Such solutions are sometimes referred to as "SSL inspection" or "Man in the Middle (MITM) SSL decryption." Inspection solutions are offered, for example, by Blue Coat Systems (Sunnyvale, Calif.), and by Check Point Software Technologies (Tel Aviv, Israel). Example inspection solutions that are produced by Netronome Systems, Inc. (Cranberry Twp., Pa.) are described in "Examining SSL-Encrypted Communications—Netronome SSL Inspector™ Solution Overview," February, 2010, which is incorporated herein by reference. SSL inspection products are also offered by Packet Forensics, Inc. (Tempe, Ariz.). SSL inspection is also addressed by Soghoian and Stamm, in "Certified Lies: Detecting and Defeating Government Interception Attacks Against SSL," April, 2010, which is incorporated herein by reference. Solutions for decrypting A51 and A52 decryption are also widely known.

Location Tracking Method Description

Figure 2:
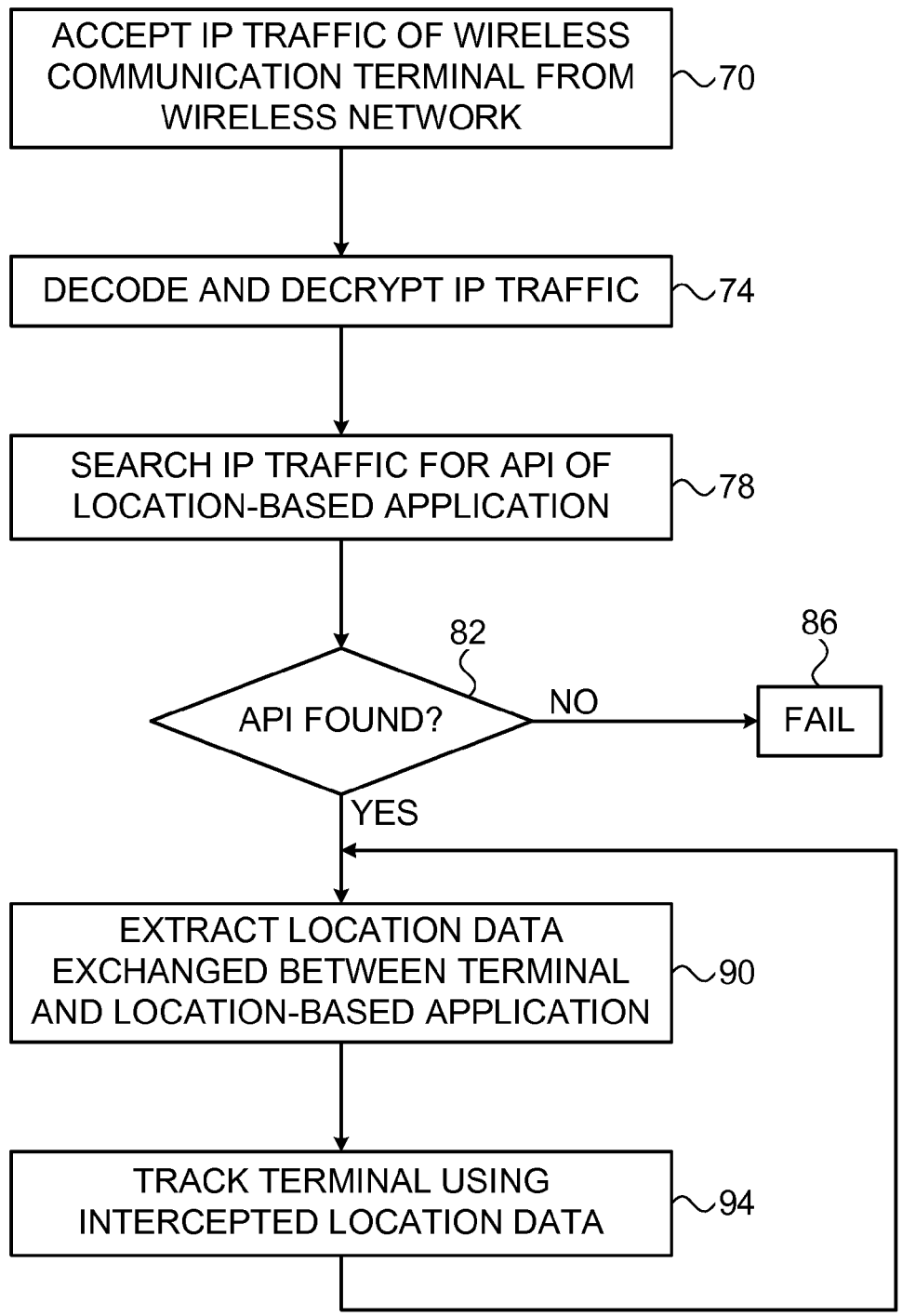
FIG. 2 is a flow chart that schematically illustrates a method for locating wireless communication terminals.

FIG. 2 is a flow chart that schematically illustrates a method for locating wireless communication terminals. The method begins with processor 52 of system 20 accepting IP traffic of one or more wireless communication terminals from network 32 via interface 48, at an input step 70. Processor 52 decodes and decrypts the IP traffic, at a decoding step 74. The processor then searches the decoded traffic for data patterns that are characteristic of known APIs used by location-based services, at a pattern searching step 78. The processor checks whether a data pattern is found, at a checking step 82. If not pattern is found, the method terminates at a failure step 86.

If a matching data pattern is found, processor 52 concludes that the traffic in question is exchanged between a terminal and a server that provides a location-based service to the terminal. The processor finds and extracts location data from the decoded IP traffic, at a location data extraction step 90. The processor then tracks the location of the terminal in question based on the extracted location data, at a tracking step 94. In some embodiments, processor 52 sends the extracted location data (or location coordinates that are computed based on the extracted location data) to monitoring center 56. In the monitoring center the location coordinates are presented to operator 60, recorded for later use or used in any other suitable way to track the terminal and/or its user.

The disclosed techniques may be carried out using either active (e.g., MITM) or passive monitoring of network communications. In some embodiments, system 20 uses the disclosed techniques to carry out indiscriminate monitoring and tracking of multiple terminals 28. For example, the system may track all the terminals in a certain geographical region, or any other suitable set of terminals. In alternative embodiments, system 20 uses the disclosed techniques to monitor and track one or more terminals that are predefined as targets.

Although the embodiments described herein mainly address lawful interception, the principles of the present disclosure can also be used in other law enforcement or intelligence applications. Typically, the disclosed techniques are useful in applications that are permitted to breach the terminal users' privacy.

It will thus be appreciated that the embodiments described above are cited by way of example, and that the present disclosure is not limited to what has been particularly shown and described hereinabove. Rather, the scope of the present disclosure includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
   monitoring, by a location system, communication exchanged between a wireless communication terminal and a wireless communication network, wherein the wireless communication network comprises a server which provides a location-based service to the terminal through application-level data that is embedded in application-level communication exchanged between the terminal and the server; wherein the monitoring comprises intercepting, by the location system, one or more interfaces or links between network elements;
   decoding, by the location system, IP traffic of the monitored communication to reproduce the application-level communication;
   searching for data patterns in the decoded IP traffic, by the location system, that are characteristic of known Application Program Interfaces (APIs) used by known location-based services;
   checking, by the location system, whether a data pattern characteristic of at least one of the known APIs is found in the decoded IP traffic by the searching;
   upon the checking finding a matching data pattern, extracting location data from the decoded IP traffic, by the location system, using the matching data pattern, wherein the location data is indicative of a geographical location of the terminal;
   tracking, by the location system, a location of the wireless communication terminal based on the extracted location data; and
   upon the terminal updating the server with second location data having a higher accuracy than the location data;
   identifying, by the location system, the updates in the monitored communication,
   extracting, by the location system, the updated location data transferred to the server, and
   refining, by the location system, a location tracking accuracy of the location system.

2. The method according to claim 1, wherein decoding the IP traffic comprises extracting an IP address associated with the terminal, and wherein tracking the location comprises finding a correlation between the extracted IP address and an identifier that identifies the terminal in the wireless communication network, and tracking the location using the identifier.

3. The method according to claim 1, wherein the IP traffic is encrypted in accordance with a secure communication protocol, and wherein monitoring the communication comprises decrypting the encrypted IP traffic.

4. The method according to claim 1, wherein the terminal is predefined as a target terminal whose location is to be tracked.

5. The method according to claim 1, and comprising indiscriminately monitoring the communication of multiple wireless communication terminals, identifying interactions between at least a subset of the terminals with one or more servers that provide location-based services, and extracting the location data of the terminals in the subset so as to track the locations of the terminals in the subset.

6. Apparatus, comprising:
   an interface for communicating with a wireless communication network; and
   a processor, which is configured to:
      monitor via the interface, communication exchanged between a wireless communication terminal and the wireless communication network, wherein the wireless communication network comprises a server which provides a location-based service to the terminal through application-level data that is embedded in application-level communication exchanged between the terminal and the server, wherein the monitoring comprises intercepting, by the location system, one or more interfaces or links between network elements,
      decode, by the location system, IP traffic of the monitored communication to reproduce the application-level communication;
      search for data patterns in the decoded IP traffic, by the location system, that are characteristic of known Application Program Interfaces (APIs) used by known location-based service;
      check, by the location system, whether a data pattern characteristic of at least one of the known APIs is found in the decoded IP traffic by the searching;
      upon the checking finding a matching data pattern, extract location data from the decoded IP track using the matching data pattern, wherein the location data is indicative of a geographical location of the terminal,
      track a location of the wireless communication terminal based on the extracted location data, and
      upon the terminal updating the server with second location data having a higher accuracy than the location data;
      identify the updates in the monitored communication,
      extract, the updated location data transferred to the server, and
      refine a location tracking accuracy of the location system.

7. The apparatus according to claim 6, wherein the processor is configured to extract an IP address associated with the terminal, to find a correlation between the extracted IP address and an identifier that identifies the terminal in the wireless communication network, and to track the location using the identifier.

8. The apparatus according to claim 6, wherein the IP traffic is encrypted in accordance with a secure communication protocol, and wherein the processor is configured to decode the IP traffic by decrypting the encrypted IP traffic.

9. The apparatus according to claim 6, wherein the terminal is predefined as a target terminal whose location is to be tracked.

10. The apparatus according to claim 6, wherein the processor is configured to indiscriminately monitor the communication of multiple wireless communication terminals, to identify interactions between at least a subset of the terminals with one or more servers that provide location-based services, and to extract the location data of the terminals in the subset so as to track the locations of the terminals in the subset.

* * * * *